United Stat [11] 3,552,382

[72] Inventor Bruce Elson Mount
     Wayne, N.J.
[21] Appl. No. 697,091
[22] Filed Jan. 11, 1968
[45] Patented Jan. 5, 1971
[73] Assignee Hoffmann-LaRoche Inc.
     Nutley, N.J.
     a corporation of New Jersey

[54] ULTRASONIC TRANSDUCER ASSEMBLY FOR BIOLOGICAL INSPECTIONS
     12 Claims, 10 Drawing Figs.
[52] U.S. Cl................................................ 128/2.05,
                                                          73/67.7
[51] Int. Cl................................................ A61b 5/02
[50] Field of Search......................................... 128/2.05
     (F)(P)(M), 2, 24.05; 73/67.7—69(Inquired)

[56]               References Cited
            UNITED STATES PATENTS
2,755,796  7/1956  Boucke .................  128/2
2,784,325  3/1957  Halliday et al. ........  73/67.7X
3,086,390  4/1963  Brown ..................  128/2X
3,103,214  9/1963  Smith ..................  128/2.05
3,181,528  5/1965  Brackin ................  128/2
3,238,767  3/1966  Clynes .................  73/67.9
3,310,049  3/1967  Clynes .................  128/2.05
3,379,901  4/1968  Richards ...............  128/2.05X

*Primary Examiner*—Anton O. Oechsle
*Attorneys*—Samuel L. Welt, Jon S. Saxe, William H. Epstein, Gerald S. Rosen, Bernard S. Leon, William G. Isgro and Jacob Frank ABSTRACT: An ultrasonic search device and method for examining physical properties within an animal or a human body, including an array of ultrasonic transducers separably mounted on a supporting member constructed to conform with and be held against the curvature of a body area, for irradiating a selected section of a body with ultrasonic energy and focusing the reflected transmitted ultrasonic energy therefrom. Associated with the transducers may be separate lens means for coupling the transducers with the body and for direction of the ultrasonic energy. The ultrasonic search device can be employed for blood pressure monitoring by placement with an inflatable cuff applied about a body limb for detection of an artery to be occluded by cuff pressure variations.

PATENTED JAN 5 1971          3,552,382
SHEET 1 OF 2
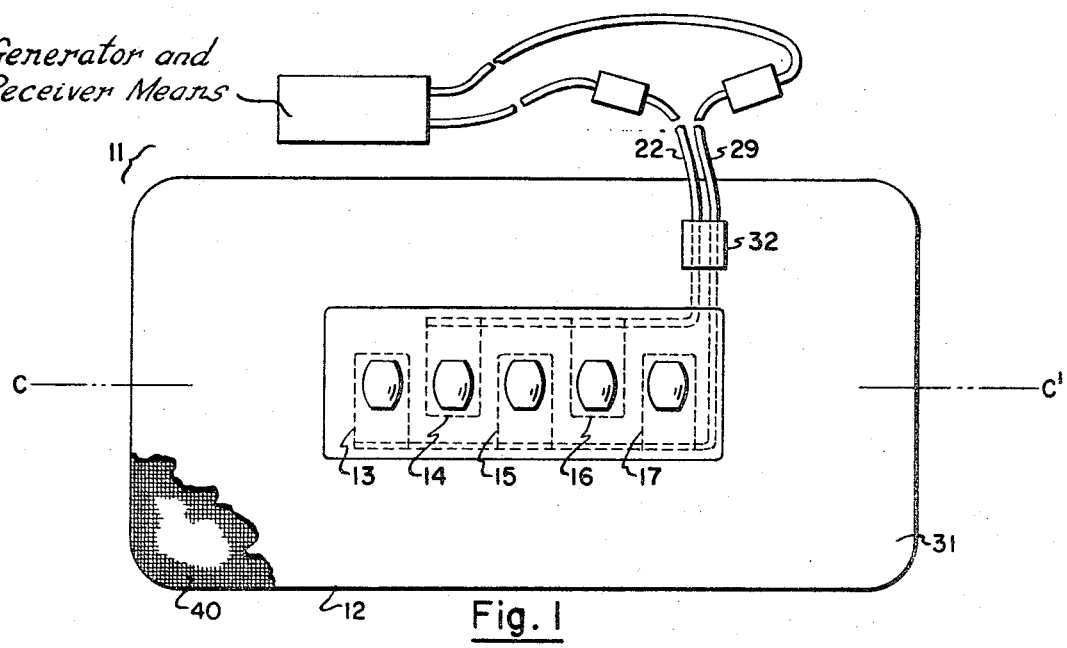
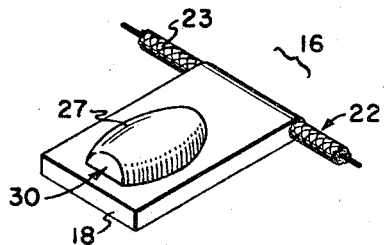
Fig. 2
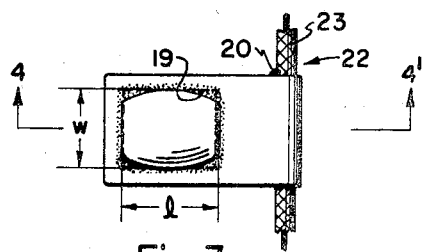
Fig. 3
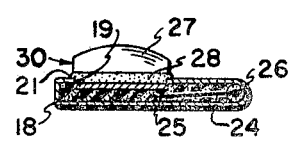
Fig. 4
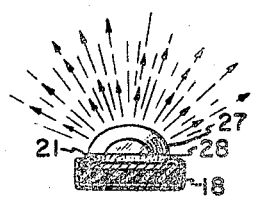
Fig. 5
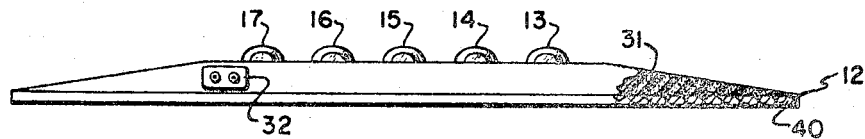
Fig. 6

PATENTED JAN 5 1971

ULTRASONIC TRANSDUCER ASSEMBLY FOR BIOLOGICAL INSPECTIONS

This invention relates in general to transducers and more particularly to ultrasonic transducer techniques and apparatus for examination of physical properties in biological investigations.

The employment of ultrasonics for purposes of biological investigation has been found an extremely useful tool; however, for some purposes, difficulties have been encountered in obtaining useful data in the application of ultrasonic transducers to human or animal body areas. Such purposes include those where a transducer unit is secured to the body for investigation of some internal physical property, and where placement of the transducer unit contiguous to the body is critical for assuring a reliable measurement of some body feature or features to be examined. In many instances, to ascertain whether proper positioning of a transducer unit has been achieved for assuring reliable data results, a number of random transducer unit placements will have to be first tested in order to provide sufficient comparative data for arriving at a determination. In at least one particular case, an ultrasonic transducer for biological investigation has also been found to be of significant importance when used in conjunction with another device such as the conventional pneumatic cuff used for measuring blood pressure and simultaneously applied to the body at a common area.

Accordingly, parameters are dictated which indicate the desirability for quick and convenient placement of transducer devices that would serve to provide for accurate and reliable data, yet simultaneously be of simple design and versatile in application. However, prior art ultrasonic transducer devices are not capable of providing such advantages, and little has been accomplished to further their adaption to a variety of situations other than the development of the simplified probe unit adapted to be manipulated by hand and held against the body by hand for investigation purposes, which prior art unit has not been found to be satisfactory for purposes of the type specified above.

One such area in the field of ultrasonics for which little exists or has been developed in the form of ultrasonic transducer devices is that pertinent to a technique for indirect measurement of blood pressure values. In brief, this technique involves detecting motion of the wall of any artery constrictable under external occlusive pressure, by means such as an inflatable cuff, during the phase of rapid transition of the arterial wall between open and closed configurations. A simplified ultrasonic transducer is employed under the cuff for transmitting and receiving ultrasonic energy. In implementation of this technique, systolic blood pressure can be observed from the external cuff or bladder pressure at the moment that the initially occluded artery first begins to change its shape from closed to open momentarily and the diastolic pressure can be observed from the cuff or bladder pressure at the moment the artery ceases to be occluded during any part of the cardiac cycle. Such changes in arterial wall position are determined preferably by use of a Doppler ultrasonic technique, where the frequency of the reflected sound wave will deviate from the fixed frequency of the transmitted wave in proportion to the velocity of a movable surface which in the instant case is the arterial wall. The reflected sound wave, thus, is a wave frequency modulated in accordance with the velocity of the arterial wall. Since an ultrasonic sensor can be held in place directly beneath the occluded cuff, the motion of the artery can be directly sensed. Detection of blood pressure in this manner is reasonably free from artifacts when the Doppler frequencies which correspond to velocities of motion other than the relatively fast arterial wall motion velocity are rejected.

Although it would seem that merely placing the transducer under the cuff to irradiate an artery with ultrasonic energy would, in operation, be sufficient to provide data for investigating arterial wall motion, this is far from the true case for the reason that the lengthwise and lateral extension of an artery, such as the brachial artery within a human arm, varies from one person to another. For example, it may be found that in some humans there may be relatively little tissue between the artery and the surface of the skin, while in others there will be a great deal of fatty tissue or muscle between the artery and the skin surface. In addition, due to the somewhat spiral course the brachial artery takes along the humerus bone, the axis of any short extension of the brachial artery is generally not parallel to the skin surface. Thus, it can be appreciated that in order to properly position a transducer device under a cuff to irradiate an artery with ultrasonic energy and receive reflected energy therefrom, a number of transducer placements may first have to be tested prior to determination of a position that would provide comparatively reliable and accurate data indicative of the arterial wall motion being investigated. Problems such as those represented by specific reference to the particular situation made mention to above for investigating arterial wall motion are substantially obviated by applicant's present invention.

This invention when properly used, provides a method and a singular apparatus useful over a wide range of body sizes and bodily variations, such as arm diameter, for investigation of internal physical properties where placement of the transducer device relative to the physical property to be examined is generally of a critical nature for assuring reliable measurement, with the realization in mind that the relative location of the physical property will vary from person to person. To attain this, the present invention contemplates ultrasonic search apparatus comprising an array of crystals and lenses associated therewith and arranged to enable the search apparatus to readily conform to a body curvature with concurrent contact of the lenses with the body to provide ultrasonic energy transmission and reception which would illuminate or cover a substantial section of the body at the surface as well as internally thereof. This invention, by readily conforming with body curvature, and in addition, by being of a design that allows it to be readily insertable between an inflatable cuff and arm, yet not affect the occlusive property of the cuff, has been found to be of especial use in combination with such a pneumatic cuff or similar pressure device for measuring blood pressure values. When the ultrasonic search apparatus is employed in combination with an inflatable cuff, it easily lends itself for insertion between the inflatable cuff and arm to partially environ a section of the arm subject to the cuff where the artery would be found and about that area where the arterial wall will be influenced by occlusion.

Other advantages and capabilities of the invention will become apparent from the following description taken in conjunction with the accompanying drawings in which:

FIG. 1 is a plan view of an ultrasonic search apparatus constructed in accordance with the present invention, with parts broken away for clarity.

FIG. 2 is a perspective view of one of the transducer subassemblies 16 illustrated in FIG. 1.

FIG. 3 shows a plan view of the transducer assembly disclosed in FIG. 2.

FIG. 4 is a cross-sectional view of the transducer subassembly, the view being taken on the line 4-4 of FIG. 3.

FIG. 5 is a cross-sectional view of the transducer subassembly taken on the line 5-5 of FIG. 4.

FIG. 6 depicts a side elevation of the apparatus shown in FIG. 1, with parts broken away for clarity.

Figure 7:
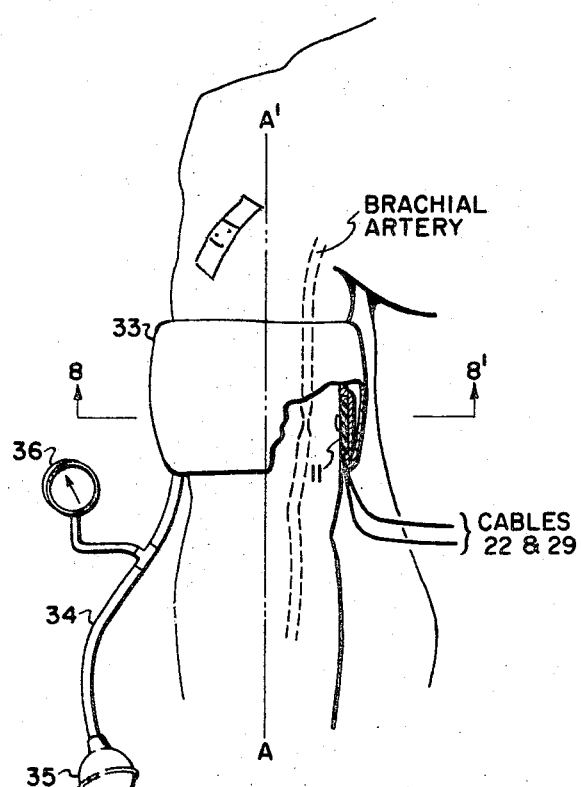
FIG. 7 is a perspective view of the search apparatus and an occlusive cuff applied to an arm of a human subject, with parts broken away for clarity.

There is shown in FIG. 1 a preferred embodiment of the present invention concerning ultrasonic transducer or search apparatus 11 having a flexible supporting member or carrier 12 depicted in a rectangularlike shape and formed of most any suitable material such as: cloth of natural or synthetic fibers; plastic; etc. Centrally positioned and extending lengthwise of carrier 12 is an array of transducers comprising five transducer subassemblies 13, 14, 15, 16, and 17, arranged at equally spaced intervals between one another.

Each of the transducer subassemblies in the present embodiment is similar in design and may best be described in relation to FIGS. 2, 3, 4, and 5 wherein there is shown a housing 18 of tinned brass or other suitable metal adapted to act as a conductor and additionally provide good RF shielding properties. The housing has a rectangular-shaped cutout 19 beneath which is seated a piezoelectric crystal wafer 21 designed to resonate in the thickness mode at the desired operating frequency, and may be formed of material such as barium titanate, lead zirconate titanate, lithium sulfate or quartz adapted to convert electrical energy to mechanical or acoustical energy and vice versa. The crystal wafer 21 is firmly mounted at its front or upper surface by sweat soldering or conductive cement to interior portions of housing 18 adjacent cutout 19. The lower surface of crystal 21 is plated (not shown) with a deposit of silver for presenting a surface whereat an electrical potential can be applied for even distribution of a charge over the crystal surface. A silver deposit is also formed on the upper surface of the crystal to which additionally establishes electrical contact with housing 18. A cable 22 extends through one side of the housing and emerges at the opposite side thereof for connection with another transducer subassembly as may be observed from FIG. 1, the cable outer insulative covering being removed to expose a grounded shield braid inner cover 23 that is electrically connected to housing 18 by a spot solder point at 20 illustrated in FIG. 3, serving to connect the upper silver deposited surface of the crystal to ground and additionally providing RF shielding for the crystal at cutout 19. A conductive wire 24 is connected up by conductive epoxy to the silver deposit coating at the bottom surface of crystal 21 at point 25, and also tied to cable lead 26 for electrically connecting the crystal with either an ultrasonic receiver or transmitter unit, or both.

The space within the housing, including that located below the crystal, is occupied by silicone rubber or like material to simultaneously provide electrical insulation at the lower surface of the crystal and prevent wasted transmission of ultrasonic energy in directions to the rear of or below the crystal which latter advantage is obtained due to the relatively poor ultrasonic transmission property of the silicone rubber.

Extending over the front surface of crystal 21 is a lens 27, which in the preferred embodiment is of plastic and where for convenience of description the lens will be defined as having a length $l$ and width $w$. The lens is rigidly secured to the crystal front surface and housing 18 by an adhesive 28 having good sound transmission properties. It is also important that a good bond be established between the crystal surface and the lens. Such an adhesive providing the desired characteristics noted above is a silver conductive epoxy available as Epoxy Products Number 3022 with a suitable hardener. A typical room temperature cured unfilled epoxy that might be used for lens 27 as well as adhesive 28 could be a Furane 1368 or Furane 202 resin with an appropriate hardener. It is important that material selected for the lens be such that it has an acoustic impedance characteristic which is as close as possible to the geometric mean of the acoustic impedance characteristic of the crystal and the skin tissue with which it is to be used to match as near as possible the impedance of the skin to the crystal for reasons to be hereinafter explained. The lens is given a convex configuration across its width dimension $w$ as may be best observed from FIGS. 2 and 5 for dispersing by refraction at the lens-skin interface ultrasonic energy emitted from the crystal as well as focusing the reflected transmitted ultrasonic energy for reception purposes. The opposing walls at ends 30 of the crystal length dimension $l$ are sharply formed to reduce dispersion of ultrasonic energy thereat.

The actual radii of curvatures of each lens along its length and width dimensions may be arrived at by application of conventional optic formulations (see Sears, F. W., Optics, Principles of Physics Series, Addison Wesley 1949), knowing given dimensions of the ultrasound propagating surface, viz. aperture 19, velocity of sound in the two mediums (the lens and skin tissue) and a given desired angle of dispersion of ultrasonic energy. The latter criterion, angle of dispersion, is separately selected for the length and width dimensions of the lens as it would be desirable to have a wide angle of dispersion along the width dimension depending on the spacing of the crystals and the variance in location of the internal physical property to be investigated, viz. how close to the skin surface an artery might be located. In contrast, it would be desirable to have a narrow angle of dispersion along the lens length dimension in those cases when the particular cross section of the body across which the search apparatus is to be applied, is known to environ the physical property to be examined, for example, brachial artery occlusion will occur within a subject area confined by the occlusive cuff.

Referring back to FIG. 1, transducer subassemblies 14 and 16 are electrically connected parallel to a common cable 22, whereby in the present embodiment cable 22 is connected to an oscillator driving unit adapted to generate or irradiate ultrasonic energy from crystals 21 of transducer subassemblies 14 and 16. An example of one dimension of the energy dispersion pattern effected by a convex lens 27 is disclosed in FIG. 5 with reference to the broken lines and arrows. In a similar manner, transducer subassemblies 13, 15, and 17 are electrically connected parallel to a common cable 29 which in the present embodiment is connected to a receiver for detection of potentials induced at crystal 21 resulting from reflected transmitted ultrasonic energy focused by lenses 27 thereat.

It has been found desirable to arrange the transmitting and receiving ultrasonic subassemblies in alternate order spaced side by side where lenses 27 are aligned along a common centerline C-C' that runs perpendicular to the length dimension $l$ of each of the lenses; however, such an arrangement may be altered to allow, for example, consecutive positioning of two or more subassemblies adapted for either a transmitting or receiving function. In some instances, it might be expedient to have common transmitting and receiving transducers such as when employing a range gated signal processing system as opposed to the continuous wave system used in the present embodiment.

As may be observed with reference to FIGS. 1 and 6, the supporting member 12 in the present embodiment comprises a nylon material base 40 which is entirely covered with a flexible, insulative material 31, such as silicone rubber, so configured to create a plateaulike effect at the center of the supporting member area where the transducer subassemblies are positioned, and is tapered from the plateaulike area to the supporting member perimeter. The level of the plateau is such that the stripped portions of cables 22 and 29 interconnecting the transducer subassemblies as well as the transducer assemblies themselves, are encapsulated by the flexible insulative material 31, except for lenses 27 shown to protrude above the level of the insulative material. In manufacture, prior to application of the silicone rubber, the transducer assemblies are first fixedly mounted on nylon member 40 by a cement such as Eastman 910; the cables are sewn to the flexible backing material 40 for strain relief; then, except for the lenses the transducer assemblies and adjacent surface of nylon member 40 are covered by a silicone primer such as General Electric 4044 and 4004, enabling a silicone rubber or similar insulative material 31, during a subsequent operation, to be adhered thereto. As may be evident from the above, material 12 is further adapted to act as a moisture seal. A cable guide 32, which might be an integral portion of the plateaulike area forming a part of the search apparatus, is designed for use as a strain relief in directing cables 22 and 29 away from the transducer subassembly area.

Figure 8:
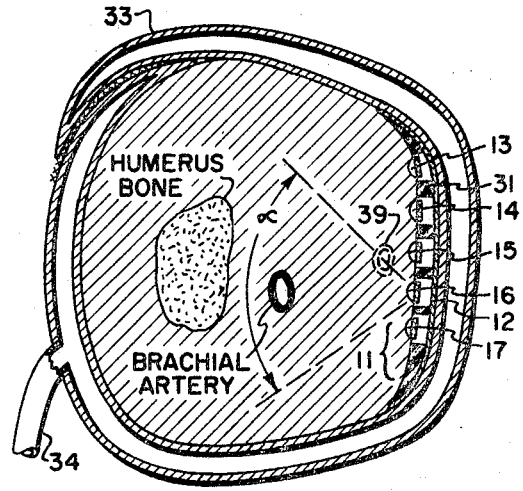
FIG. 8 is a cross-sectional view taken along the line 8-8 of FIG. 7.
Figure 10:
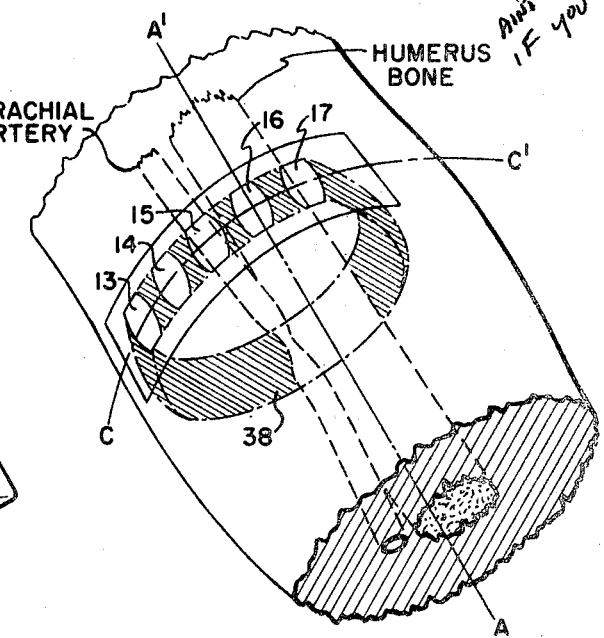
FIG. 10 is a schematic view of a portion of the arm subject, illustrating placement and coverage of the search apparatus to carry out investigations in accordance with the invention.

In FIGS. 7, 8, and 10, there is disclosed a further aspect of the present invention illustrating how ultrasonic search apparatus depicted in FIGS. 1 through 6 is used in combination with an inflatable pneumatic cuff 33 placed about an arm for measurement of blood pressure values. For convenience in describing various positional relationships, let A-A' define a mean longitudinal axis of that segment of an arm length to be examined. The pneumatic cuff is connected by flexible tubing 34 to a suitable pump such as the usual bulb 35 used to inflate the cuff, and also connected to a pressure gauge 36 to indicate pressure values existing within the inflated cuff. As previously noted, this technique involves use of the Doppler effect for detection of wall motion of an artery, such as the brachial artery, constrictable under external occlusive pressure during the phase of rapid transition of the arterial wall between open and closed configurations. The opening and closing arterial wall motion made mention to will occur within that portion of the arm subject to the pneumatic cuff. Accordingly, search apparatus 11 depicted in FIGS. 1 through 6 is placed between the cuff and arm so that the lengthwise dimension of the search apparatus is wrapped about the arm to partially environ its outer circumference. In actual practice, it has been found that to obtain optimum results, placement of the transducer subassemblies would occur just below the midline of the cuff as illustrated in FIG. 7, which serves to minimize the detection of pulse waves from above the arterial constriction by the transducer subassemblies during the presystolic portion of the cuff deflation cycle. Due to the flexibility of the search apparatus, it readily conforms with the arcuate surface of the arm about which it is placed and does not significantly change the occlusive properties of the cuff enabling the fairly even application of pressure about the artery to be maintained. At this point, it is evident that a single flexible search apparatus of the type described may be used for a large range of size arms in adults and children.

Figure 9:
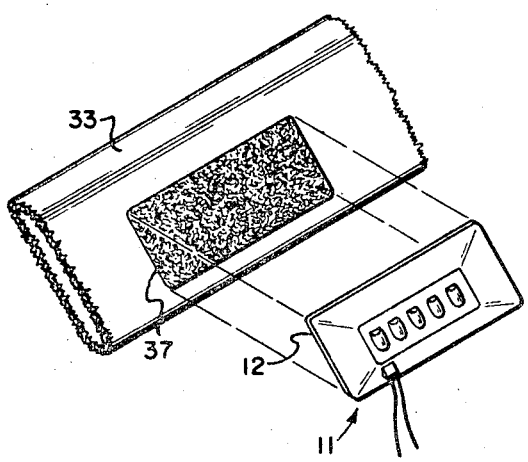
FIG. 9 is an isometric view of a portion of the occlusive cuff with the search apparatus exploded frontwardly.

A suitable technique for removably mounting search apparatus 11 on cuff 33 allowing for convenience in placement of the search apparatus between the arm and cuff is shown in FIG. 9, wherein a fastener of the Velcro type comprising hook and pile tapes, is utilized, by sewing or otherwise securing a pile tape 37 on cuff 33 for use with a hook tape the outer surface of nylon member 40 of flexible supporting member 12, to form a removable closure. Other suitable techniques for removably securing the search apparatus to the cuff might call for: a pocket in the cuff adapted to hem in or confine the sides of the search apparatus, yet exposing the transducer subassemblies for contact with the arm; or a snap fastening arrangement. An alternative solution could be to provide a strap secured at each end of the search apparatus, and tying together the two free ends of the strap about the arm, thus dispensing with the necessity of removably attaching the search apparatus to the cuff.

The utilization of the search apparatus in combination with the cuff is explained below; however, as will become apparent from its mode of operation, the search apparatus could be used independently or in combination with apparatus other than the inflatable cuff, which use of course would in part depend upon the nature of the physical property to be investigated. For example, the search apparatus might be employed to environ a portion of a pregnant woman's abdomen to sense the motion of the fetal heart, in which case it may be desirable to provide a matrix of transducer subassemblies rather than an array of the type disclosed since the fetal heart is contained within an abdomen having a large surface area. Again, due to the flexibility of the search apparatus, it could be readily used for a large range of patients despite the fact that the curvature of a pregnant woman's abdomen not only varies from patient to patient, but continuously varies with the individual patient.

In operation, the crystals of transducer subassemblies 14 and 16 are excited by a suitable oscillator via cable 22 to emit ultrasonic energy at some predetermined frequency which could, for example, be in the range of 1 to 10 megacycles. Due to the manner in which the search apparatus is arranged on the arm and as a result of lens 27 configurations, ultrasonic energy will be transmitted in directions divergent to the lens length which would, for example, disperse the irradiation of ultrasonic energy in directions transverse to longitudinal axis A-A' over an angle α as illustrated in FIG. 8 relative to transducer subassembly 16; however, as a result of the sharply defined ends 30 of lenses 27, the irradiation of ultrasonic energy is substantially limited or restricted between a pair of planes nearly perpendicular to the mean longitudinal axis A-A'. Similarly, lenses 27 of transducer subassemblies 13, 15 and 17 are given the same configurations, but for focusing the reflected transmitted energy from directions divergent to the lens lengths 1, onto their respective crystal surfaces. The reflected transmitted energy is converted by the crystal and directed by way of cable 29 to a suitable receiver for detection of a Doppler signal component indicative of arterial wall motion. As a result of matching of the acoustic impedance of skin to the crystal by lens 27 and adhesive 28, a minimum interference with the transfer of ultrasonic energy from crystal to skin is encountered. It is additionally noted, of course, that in order to provide suitable coupling at the skin and the lens interfaces for preventing attenuation of the ultrasonic energy, a coupling medium, such as water or mineral oil, is employed thereat.

As may be appreciated, with reference to the above, due to the wide ultrasonic energy coverage across an arm section, the chances of irradiating the brachial artery with but a single positioning of the search apparatus and assuring a reliable Doppler signal are greatly enhanced, thereby virtually obviating the necessity of critical placement of the search apparatus which otherwise would most likely produce erratic measurements of blood pressure leading to subsequent loss of confidence in the measurement by the user. The resultant effect of the coverage of an arm section by search apparatus of the present invention is best depicted in FIG. 10 wherein shaded area 38 substantially environs a cylindricallike section of the arm, which section is irradiated by ultrasonic energy for investigation of the arterial wall motion. This entire section of the arm is subject to cuff 34 where arterial wall motion will be induced by proper application of pressure to the cuff to occlude the brachial artery therebeneath. By selectively restricting the irradiating ultrasonic energy within the cylindricallike shaped section of the arm subject to the inflatable cuff, moving extraneous structures within the arm outside this selected section and outside the portion of the arm subject to the inflatable cuff are ignored, as Doppler signals which might otherwise be reflected by such extraneous structures are eliminated ab initio. Accordingly, reflected ultrasonic energy focused on transducer subassemblies 13, 15, and 17 from the irradiated section of the arm will, for all practical purposes, only contain Doppler components indicative of arterial wall motion along a preselected area of the brachial artery.

When employing search apparatus of the type disclosed in combination with an inflatable cuff as discussed above, it has been found expedient to provide a coverage by the transducer subassemblies end to end along the centerline C-C' illustrated in FIGS. 1 and 10 of a minimum arcuate distance equal to substantially 60° of the arm circumference for reliable and accurate measurement, although a preferred arcuate distance would lie between 90° to 120° of the arm circumference. In the present embodiment, the transducer assembly end to end distance along center line C-C' is approximately 3 inches where parameters such as the number of crystals, individual crystal widths, and lateral spacing, are suitably adapted for maximum coverage of the cylindricallike section included within shaded area 38 for the range of arm diameters selected. These parameters are so adapted so that an arterial extension near the arm surface such as that denoted as 39 in FIG. 8 might not be missed, despite which arm size within the preselected rang of arm diameters the search apparatus might be used with. It should be understood that since the present invention calls for a single search apparatus suitable for use with a large range of arm diameters of adults and children, the arcuate coverage relative to each subject will vary with the arm width of the particular subject. With the above in mind, suitable lens widths were adapted with adequate spacing between neighboring lenses that would, in turn, allow for flexibility of the search apparatus. Should search apparatus of the type disclosed be specifically adapted for utilization with a small range of arm diameters, it may be possible to do away with the convex configurations given to the lenses for the reason that the spacing between neighboring lenses may be minimized.

Further, it is noted that although five transducer subassemblies are shown in the drawings, as little as two transducer subassemblies could be used, especially when employing a range gated processing system where each subassembly acts as a transmitting and receiving transducer, or when a small arm diameter is to be investigated.

Obviously many modifications and variations of the present invention are possible in the light of the above teachings. It is therefore to be understood that within the scope of the appended claims, the invention may be practiced otherwise than as specifically described.

I claim:
1. Ultrasonic search apparatus for use with a body comprising:
 a flexible device constructed and arranged to be flexible about a transverse axis to conform with the curvature of a body area, said device extending longitudinally to define a longitudinal axis perpendicular to said transverse axis;
 a plurality of transducer means mounted on said device along its longitudinal axis in spaced relation to present a strip shape configuration;
 means for holding the device along its longitudinal axis against the body when so applied to such a body;
 means for coupling at least one of the transducer means with generator means for transmitting ultrasonic energy therefrom;
 means for coupling at least one of the transducer elements with receiver means for detecting reflections of the transmitted ultrasonic energy; and
 each of said transducer means including an ultrasonic transducer element and lens means whereby said lens means have ends defining planes substantially perpendicular to said transverse axis with upper surfaces of a convex configuration, adapted to selectively inundate with ultrasonic energy from said strip shape area a corresponding narrow section of a body upon which the search apparatus is to be used.

2. Apparatus according to claim 1 wherein:
said flexible device includes a flexible supporting member; and
a jacket of readily deformable plastic material to cover the flexible carrier means forming a protective and insulative cover therefor but leaving said lens means exposed.

3. Apparatus according to claim 2 wherein said lens means are adapted to protrude outwardly from said jacket for contact with such a body.

4. Apparatus according to claim 3 including separate housing means within said flexible device for individually supporting said transducer elements and shielding said transducer elements from extraneous interference in the radio frequency range.

5. Apparatus according to claim 1 including enwrapping means adapted to support said search apparatus, and means provided on said flexible supporting member for removable securement of the search apparatus to said enwrapping means.

6. In an apparatus for measuring blood pressure values:
 an inflatable cuff adapted for encirclement about a portion of a body limb containing an artery for occluding such an artery;
 transducer means for detecting arterial wall motion in response to coaction of arterial pressure with occluding pressure;
 the transducer means positionable between said cuff and body limb and adapted not to significantly alter the occlusive properties of the inflatable cuff;
 the transducer means adapted to conform with the partially environ a surface defined by such a limb and to irradiate with ultrasonic energy a section of the limb subject to the cuff and wherein the artery is to be occluded;
 said transducer means comprising a supporting member and an array of ultrasonic transducer elements secured to and strung out along the supporting member to present a strip shape configuration;
 means for coupling at least one of the transducer elements with generator means for transmitting ultrasonic energy therefrom;
 means for coupling at least one of the transducer elements with receiver means for detecting reflections of the transmitted ultrasonic energy; and
 separate lens means coupled with said transducer elements for guiding said ultrasonic energy.

7. Apparatus according to claim 6 wherein said transducer means is flexible about a transverse axis and the strip shape array of transducer elements is adapted to extend longitudinally to define a longitudinal axis perpendicular to said transverse axis.

8. Apparatus according to claim 7 wherein said lens means are adapted to disperse ultrasonic energy emitted from the transducer elements through such a limb section in directions limited along such a longitudinal axis.

9. Apparatus according to claim 8 wherein said lens means are further adapted to focus reflections of the emitted ultrasonic energy from such a limb section.

10. Apparatus according to claim 9 wherein each of said lens means is of a convex shape about an axis substantially parallel to such a transverse axis.

11. Apparatus according to claim 9 including means for minimizing dispersion of ultrasonic energy emitted from the transducer elements through such a body limb in other than such a limb section.

12. Apparatus according to claim 11 wherein each of said lens means is of a convex shape about an axis substantially parallel to such a transverse axis and said dispersion-minimizing means includes sharply formed ends on said lenses which ends define a pair of planes substantially perpendicular to such a transverse axis.